United States Patent [19]

Nakazono

[11] 4,138,704
[45] Feb. 6, 1979

[54] OPERATING MECHANISM OF TAPE RECORDER

[75] Inventor: Akio Nakazono, Nagoya, Japan

[73] Assignee: Shin-Shirasuna Electric Corp., Aichi, Japan

[21] Appl. No.: 847,232

[22] Filed: Oct. 31, 1977

[30] Foreign Application Priority Data

Nov. 8, 1976 [JP] Japan .................. 51/149882

[51] Int. Cl.² ............................ G11B 5/00
[52] U.S. Cl. ..................... 360/137; 360/60; 360/61
[58] Field of Search ............... 360/60, 61, 62, 63, 360/137; 74/483 PB; 200/5 B

[56] References Cited

U.S. PATENT DOCUMENTS

| 3,739,106 | 6/1973 | Huijsers | 360/60 |
| 3,940,800 | 2/1976 | Tabuchi | 360/60 |
| 3,975,765 | 8/1976 | Kamaya | 360/60 |
| 4,000,514 | 12/1976 | Fukatsu | 360/60 |
| 4,003,087 | 1/1977 | Iwasaki et al. | 360/60 |

Primary Examiner—Vincent P. Canney
Attorney, Agent, or Firm—Bacon & Thomas

[57] ABSTRACT

An operating mechanism of a tape recorder, means is provided for preventing the erase head from engaging the tape to erase the tape when cue or review is effected during recording or play-back operation.

2 Claims, 6 Drawing Figures

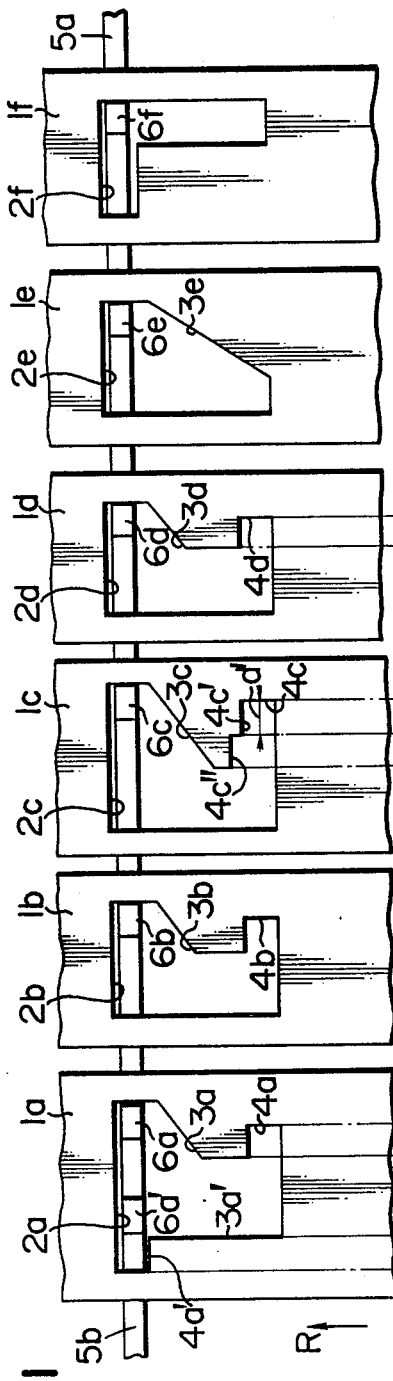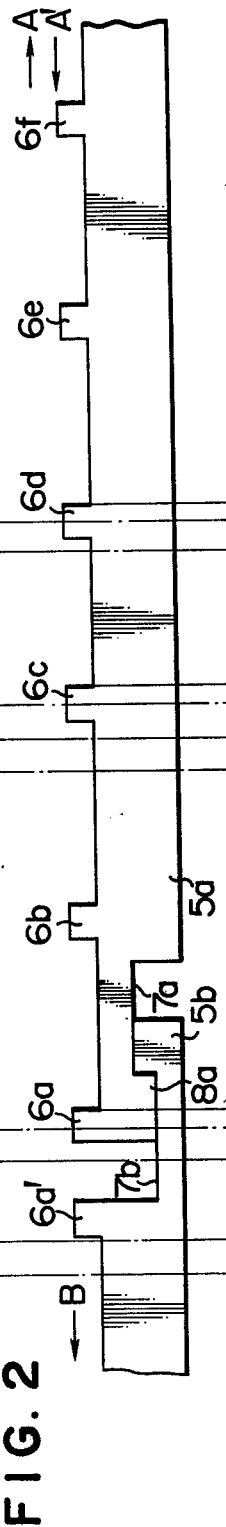
FIG. 1
FIG. 2
FIG. 3

OPERATING MECHANISM OF TAPE RECORDER

This invention relates to an operating mechanism of a tape recorder.

Tape recorders have been proposed and put into use which have the functions of enabling fast forward movement (cue) or rewind (review) of the tape during recording or play-back operation. In these tape recorders, it is necessary that the position for play-back operation be maintained when and after the cue or the review operation is utilized. Moreover, during this time the erase head should be prevented from engaging the tape by mistake, for example. This is because the cue or the review function cannot be performed if the position for play-back operation is released when the cue or the review function is utilized. Also, the erase head engages the tape by mistake, for example, the record on the tape will be erased.

It is therefore an object of the present invention to provide an operating mechanism of a tape recorder which is provided with means for preventing the erase head from engaging and erasing the tape when a cue or review function utilized is during recording or play-back.

Other objects, features and advantages of this invention will become apparent from the following description taken in conjunction with the accompanying drawings.

FIG. 1 is a schematic plan view showing the essential portions of the operating mechanism of a tape recorder according to an embodiment of the present invention.

FIG. 2 is a front elevational view showing a pair of slider bars according to this invention in the relation to FIG. 1.

FIGS. 3(A) to (D) are views useful for explaining the operation of the mechanism shown in FIG. 1.

With reference to the drawings, description will now be made of the mechanism according to an embodiment of this invention. In the drawings, reference characters 1a to 1f designate a recording lever, a review lever, a play-back lever, a cue lever, a stop lever and an eject lever. Each lever has one end portion (lower end portion as viewed in FIG. 1) projected from a side wall of a chassis (not shown) and capable of being pushed in the direction of arrow R against the bias force of a spring. These levers 1a to 1f are formed with through-apertures 2a to 2f configured as shown in FIG. 1. The through-apertures 2b and 2d formed in the review lever 1b and the cue lever 1d, respectively, may be similar in configuration and are provided with inclined edges 3b and 3d and restraining recesses 4b and 4d. The through-aperture 2a has a side edge 3a''. The through-aperture in the stop lever 1e has an inclined edge 3e but is formed with no restraining recess like those mentioned above. The through-aperture 2f in the eject lever 1f is formed in an inverted L-shape. The through-aperture 2c in the play-back lever 1c has an inclined edge 3c which recess, and the restraining recess 4c is provided with two stepped portions 4c' and 4c'' at the forward edge thereof. Further, it should be noted that the through-aperture 2a in the recording lever 1a has an inclined edge 3a and a restraining recess 4a similar to those in the review lever 1b and the cue lever 1d. Through-aperture 2a also has an additional restraining recess 4a' provided at its forward edge opposite from the restraining recess 4a.

Below the levers 1a to 1f (as viewed in FIG. 1), a first slider bar 5a and a second slider bar 5b extend transversely of and perpendicularly to these levers and are slidable in a plane orthogonal to the major surfaces of those levers. These first and second slider bars 5a and 5b are spring-biased in opposite directions as indicated by arrows A and B, the spring bias for the first slider bar 5a being greater than the spring bias for the second slider bar 5b. The first slider bar 5a has projections 6a to 6f formed integrally therewith as shown in FIG. 2. The second slider bar 5b is provided with a projection 6a'. These slider bars 5a and 5b are further provided with cut-aways 7a and 7b and engagement pieces 8a and 8b at the lower edges thereof, and are engaged with each other in the manner as shown in FIG. 2. The projections 6a' and 6a to 6f are inserted in the through-apertures 2a to 2f and associated with respective ones of the levers, as shown in FIG. 1. FIG. 1 shows a position in which none of the levers is pushed in, and FIG. 2 shows the then position of the first and second slider bars 5a and 5b with respect to the positional relation between the projections and associated through-apertures. In this position, it will be seen that the projection 6a is located forwardly of the inclined edge 3a of the through-aperture 2a in the recording lever 1a while the projection 6a' lies inwardly of the additional restraining recess 4a' of the through-aperture 2a, so that the recording lever 2a is ready to be pushed in.

To effect recording operation in the position shown in FIG. 1, the recording lever 1a and the play-back lever 1c may be pushed in at a time in a conventional manner. Thereupon, as for the recording lever 1a, the projection 6a is guided into the restraining recess 4a by the inclined edge 3a while the projection 6a' is brought into contact with and guided by the side edge 3a' of the through-aperture 2a and thus, these projections 6a and 6a' assume their positions indicated by 6a and 6a' in FIG. 3(A). At the same time, as for the play-back lever 1c, the projection 6c is guided by the inclined edge 3c and brought into engagement with the first stepped portion 4c' of the restraining recess 4c, and assumes its position indicated by 6c in FIG. 3(A). Thus, the first slider bar 5a is slid in the direction of arrow A' against the spring bias in the direction of arrow A, by a distance d indicated in FIG. 3(A), while the second slider bar 5b is slid somewhat in the same direction as that of the spring bias acting thereon in the direction of arrow B but can never be slidden any more in the direction of arrow A' or B because the projection 6a' is brought into contact with the side edge 3a' of the through-aperture 2a, as already noted. As regards, for example, the cue lever 1d in this case, this lever is not pushed in and so, the projection 6d associated therewith is moved in the direction of arrow A' by a distance d indicated in FIG. 3(A) to assume its position indicated by 6d, which lies forward of the inclined edge 3d of the through-aperture 2d.

In such position when the cue function is utilized as by pushing in the cue lever 1d, the projection 6d is guided in the direction of arrow A' by the inclined edge 3d of the through-aperture 2d in that lever to thereby move the first slider bar 5a in the same direction. The result, as seen in FIG. 3(B), is that the projection 6c engaged with the first stepped portion 4c' of the play-back lever 1c is momentarily shifted to the second stepped portion 4c'' and engaged therewith. The first slider bar 5a is further slid further in the direction of arrow A' by a distance corresponding to the length d' (FIG. 1) of the first stepped portion 4c' of the play-back lever 1c. When this occurs, the play-back lever 1c is retracted by an amount corresponding to the difference between the levels of the first stepped portion 4c' and the second stepped portion 4c''. Suitable means (not shown) is of course provided which is associated with the play-back lever 1c to maintain the position for play-back operation irrespective of such retraction of the play-back lever. When the first slider bar 5a is so slid in the direction of arrow A' by a distance corresponding to the aforementioned length d', as will be seen in FIG. 3(B), the projection 6a disengages the restraining recess 4a of the recording level 1a to permit the lever 1a to retract and return to its non-pushed-in position shown in FIG. 1. At the same time, the projection 6a' of the second slider bar 5b comes into the additional restraining recess 4a' formed in the recording lever 1a, thus preventing the recording lever 1a from being pushed in by mistake in the position for play-back operation. Also in this case, the projection 6d associated with the cue lever 1d is shifted to its position of FIG. 3(B), which is off the inclined edge 3d of that lever 1d and therefore, the position for play-back operation is maintained without the first slider bar 5a being slid even if the cue lever 1d is again pushed in while it is in such a position. If the stop lever 1e is then pushed in, the inclined edge 3e thereof is engaged with the projection 6e, thereby restoring the position of FIG. 1 immediately.

When, in the position of FIG. 1, the play-back lever 1c alone is pushed in, namely, when the stop position is shifted into the play-back position, the projection 6c is engaged with the first stepped portion 4c' of that lever. The projection 6a' of the second slider bar 5b is partly engaged with the additional restraining recess 4a' of the recording lever 1a, as seen in FIG. 3(C), and when the cue lever 1d, for example, is then pushed in, the projection 6c is shifted to the second stepped portion 4c'' of the play-back lever 1c in the same manner as described above. The result, as seen in FIG. 3(D), is that the projection 6a' comes into the restraining recess 4a', thus preventing the recording lever 1a from being pushed in while it is in any of the positions of FIGS. 3(C) and (D).

For convenience, the foregoing description has been made with respect to a situation where the cue is activated during recording or play-back, but it will readily be appreciated that the above description is equally applicable to a case where the review is activated. It will also be apparent that the eject lever 1f may be pushed in the position of FIG. 1, namely, in the stop position.

In the above-described embodiment, each lever is provided with a through-aperture and these apertures are formed with inclined edges and restraining recesses as described. The levers other than the recording lever need not be provided with such through-apertures but inclined edges and restraining recesses similar to those described above may be provided on one side edge of those levers.

According to the present invention, as will be appreciated, the object stated at the outset can be reliably achieved by a simple construction in which the levers are provided with the inclined edges, restraining recesses, etc. of the described configuration and a pair of slider bars is associated with each of the levers.

While this invention has been described with respect to one specific embodiment thereof, it should be understood that the invention is not restricted thereto but various modifications and changes may be made therein without departing from the spirit and scope of the invention as defined in the appended claims.

What is claimed is:

1. An operating mechanism of a tape recorder comprising at least a recording lever, a play-back lever and a review lever or a cue lever each capable of being depressed from a first position to a second position, wherein if the review or the cue lever is depressed when the recording or the play-back operation is activated by the recording lever and/or the play-back lever being depressed, the position for play-back operation is maintained during either of the recording or the play-back operations, said mechanism comprising:
    (a) a first slider bar spring biased in a first direction,
    (b) a second slider bar spring biased in a second direction, opposite said first direction,
    (c) said first and second slider bars extending transversely of and perpendicularly to said levers and being slidable in a plane orthogonal to a major surface of each of said levers,
    (d) said first slider bar having at least one projection associated with each of said recording, play-back and review or cue levers, said recording, play-back and review or cue levers having cam surfaces thereon engaging said projections for moving said first slider bar in said second direction,
    (e) said second slider bar having at least one projection associated with said recording lever, said recording lever having a surface for contacting said projection of said second slider bar,
    (f) said first and second slider bars having cooperating engagement surfaces wherein said second slider bar is normally held against movement in said second direction by said first slider bar and wherein depression of said cue or play-back levers moves said first slider bar in said second direction for permitting spring bias movement of said second slider bar in said second direction to a predetermined position, and
    (g) said predetermined position of said second slider bar fixing said projection of said second slider bar against said surface of said recording lever for preventing depression of said recording lever whereby recording by said tape recorder is prevented upon depression of said cue, review or play-back levers.

2. The operating mechanism of claim 1, wherein the spring bias imparted to said first slider bar is greater than the spring bias imparted to said second slider bar.

* * * * *